United States Patent [19]

McCabe, Jr.

[11] 4,224,366
[45] Sep. 23, 1980

[54] MOISTURE ABSORPTION SECTIONAL PACK

[76] Inventor: Edward G. McCabe, Jr., 951 Wellesley Rd., Pittsburgh, Pa. 15206

[21] Appl. No.: 952,809

[22] Filed: Oct. 19, 1978

Related U.S. Application Data

[63] Continuation-in-part of Ser. No. 872,340, Jan. 25, 1978, Pat. No. 4,124,116, which is a continuation-in-part of Ser. No. 768,844, Feb. 15, 1977, abandoned.

[51] Int. Cl.² .................... B32B 3/00; B32B 3/12; B32B 3/20
[52] U.S. Cl. .................... 428/72; 428/157; 428/166; 428/188; 428/306; 428/913
[58] Field of Search ............ 428/72, 178, 188, 304, 428/166, 68, 157, 177, 306, 913; 206/204, 524.6; 229/56; 34/95; 55/384, 387

[56] References Cited

U.S. PATENT DOCUMENTS

| | | | |
|---|---|---|---|
| 2,545,710 | 3/1951 | Snyder | 206/204 X |
| 2,578,324 | 12/1951 | Southwick, Jr. | 55/387 |
| 3,034,922 | 5/1962 | Böe | 162/158 |
| 3,343,897 | 9/1967 | Keller | 206/204 X |
| 3,661,815 | 5/1972 | Smith | 260/17.4 GC |
| 3,812,001 | 5/1974 | Ryan | 428/178 |
| 4,124,116 | 11/1978 | McCabe, Jr. | 55/384 |

*Primary Examiner*—William J. Van Balen

*Attorney, Agent, or Firm*—Stanley J. Price, Jr.; John M. Adams

[57] ABSTRACT

Upper and lower contiguous sheets are bonded to each other at their outermost contiguous edges thereof to form an enclosure. The enclosure is divided into a plurality of sectional compartments isolated from each other by barrier sheets which are formed by bonding the upper and lower sheets in a conventional manner. Each sectional compartment contains a predetermined quantity of absorbent granules. The barrier sheets separating the compartments and at least one of the upper and lower contiguous sheets are dissolving paper fabricated of a water soluble carboxy methyl cellulose compound. In one embodiment both the upper and lower sheets are dissolving paper which dissolve together with the barrier sheets when the absorbent granules have absorbed a predetermined amount of moisture and/or liquid. The barrier sheets disintegrate to release the absorbent granules from each sectional compartment. The upper and lower sheets also disintegrate so that the absorbent granules are released from the pack to absorb additional moisture or liquid surrounding but removed from contact with the pack. In a second embodiment the barrier sheets and the upper sheet are dissolving paper and the lower sheet is a mildew resistant sheet operable to retain the moisture or liquid and the absorbent granules in the pack to prevent moisture or liquid from passing through the pack before being absorbed by the granules.

4 Claims, 4 Drawing Figures

MOISTURE ABSORPTION SECTIONAL PACK

CROSS REFERENCE TO RELATED APPLICATIONS

This application is a continuation-in-part of U.S. application Ser. No. 872,340, entitled "Liquid Absorbing Sectional Pack", which was filed in the United States Patent and Trademark Office on Jan. 25, 1978, now U.S. Pat. No. 4,124,116, which, in turn, is a continuation-in-part of U.S. application Ser. No. 768,844, entitled "Liquid Absorbing Sectional Pack", which was filed in the United States Patent and Trademark Office on Feb. 15, 1977, and now abandoned.

BACKGROUND OF THE INVENTION

1. Field of the Invention

This invention relates to an improved moisture absorption sectional pack and more particularly to a moisture and liquid absorption and sectional pack operable to absorb moisture/liquid maintained in contact with the pack and to release absorbent granules from the pack upon contact with moisture or liquid to absorb additional moisture or liquid surrounding the pack and removed from contact therewith.

2. Description of the Prior Art

Desiccant containers operable to absorb water vapor, liquids and the like are well known in the art as disclosed in U.S. Pat. No. 2,578,324, which teaches a package made of water vapor permeable sheets of fibrous material with heat-sealable coating on one surface of the fibrous sheet. A fibrous material, such as tissue paper, is embedded in the coating. The sheets are arranged into a container and a desiccant, such as silica gel, is sealed in the container whereby water vapor is readily absorbed through the walls of the container. The volume of water vapor capable of being absorbed is determined by the absorbent capacity of the volume of desiccant in the container. Once this capacity has been exceeded, however, the container is not operable to absorb additional water vapor to which it is exposed.

It is known, as disclosed in U.S. Pat. No. 2,713,214, to reduce perspiration of the feet when worn in a shoe by a shoe pad formed by a plurality of individually sealed pockets containing a foot powder. The pad is positioned in the shoe, and the pad follows the contour of the inner shoe. The pad when worn in the shoe functions to remove foot odor and reduce perspiration of the feet.

Substances capable of absorbing relatively large amounts of fluids are used in manufacturing products of the above described type to increase the water absorbency of the products. U.S. Pat. No. 3,611,815, disclosed a water insoluble granular solid comprising an alkali metal carboxylate salt of a starch-polyacrylonitrile graft copolymers. The granular solids have the ability to absorb water in amounts in excess of 50 parts per part thereof while retaining their granular character. The granules, as disclosed, are useful in the manufacture of liquid absorbing products.

While it has been suggested by the prior art to provide liquid absorbing devices in which the desiccant is retained in a liquid or moisture permeable sheet material, the absorbent properties of the known devices are limited by the quantity of liquid or moisture the container and desiccant are capable of absorbing. Thus, for a device having sealed sections with a fixed volume of desiccant in each section, the absorbent capacity of the entire device is limited by the capacity of each section. Thus, unless the remaining sections are exposed to the liquid or moisture, the entire device is limited to the absorbent capabilities of one section. Consequently, liquid or moisture in the vicinity of the pack but removed from contact with the pack is not absorbed when the desiccant materials are confined in the pack and removed from contact with the surrounding moisture or liquid.

Therefore, there is need for an improved material or liquid absorbing device containing a plurality of sections having absorbent capacity to absorb all the moisture or liquid entering an individual section where the moisture or liquid is confined in the pack and absorbed before flowing from the pack and moisture or liquid surrounding but removed from immediate contact with the pack is also absorbed.

SUMMARY OF THE INVENTION

In accordance with the present invention there is provided an improved moisture absorption pack that includes upper and lower contiguous sheet members bonded to each other at the outermost contiguous edges thereof for forming an enclosure. Barrier members divide the enclosure into a plurality of sectional compartments isolated from each other between barrier members. The sectional compartments each contain a predetermined quantity of absorbent granules. The barrier members and at least one of the upper and lower contiguous sheet members are a dissolving paper fabricated of a material selected from the group consisting of a water soluble carboxy methyl cellulose compound and a methocel compound. The dissolving paper is operable to dissolve when the absorbent granules have absorbed a predetermined amount of moisture or liquid so that the barrier members disintegrate to release the absorbent granules from each of the sectional compartments and at least one of the upper and lower contiguous sheet members disintegrates to break open the sectional compartments and release the absorbent granules from the pack to absorb increased amounts of moisture or liquid.

The absorbent granules enclosed in each sectional compartment of the absorption pack have a composition preferably consisting of alkali metal carboxylate salts of starch-polyacrylonitrile graft copolymers as described in U.S. Pat. No. 3,661,815, referred to hereinabove. The amount of absorbent granules in each section and the size of each section depends on the amount of liquid to be absorbed by the plurality of sections forming the sectional pack. For example, a sectional pack having 20 sections or compartments would include 1/20 of one pound of liquid absorbing granules in each section. Thus, a 20 section liquid absorbing sectional pack would contain a total of one pound of liquid absorbing granules and would be capable of absorbing a total 50 pounds of liquid.

Each section or compartment holds same amount of absorbent granules so that each section of the pack has the same liquid absorbing properties regardless of the position of the pack in use, because the absorbent granules are confined to the respective sections. This permits the sectional pack to be placed in any desired environment and in any desired position such as parallel, perpendicular or at an angle to the supporting surface. Thus, the improved liquid absorption sectional pack of the present invention is particularly suitable for use with containers and enclosures such as optical lense cases, burial caskets, storage rooms, railroad cars and other types of containers or enclosures that must remain free of moisture and/or liquid. The liquid absorbing sectional pack of the present invention is particularly adapted for use as a drying agent in the storage of furniture or the storage of any other material where it is essential that the material remain dry.

In one embodiment of the present invention both the upper and lower contiguous sheets of the pack together with the barrier members are fabricated of dissolving paper. In the presence of moisture and/or liquid, the barrier sheets dissolve allowing the absorbent granules to escape from their respective compartments thereby increasing the absorption capability of the pack to absorb all the moisture and/or liquid entering the pack through one compartment. In addition, the portions of the upper and lower sheets coming in contact with the moisture and/or liquid disintegrate. Consequently, the pack is broken open and the absorbent granules are released from the immediate confines of the pack to an area beyond the pack. The moisture and/or liquid which passes through the pack before being absorbed or the moisture and/or liquid surrounding but removed from contact with the pack is absorbed by the granules which are released from the pack.

The absorption capabilities of the pack are not confined to the immediate area of the pack but are operable to extend beyond the pack by release of the absorption granules. This arrangement is particularly advantageous to the prevention of accumulation of moisture and/or liquid in a shipping container of package which is turned during shipment and the absorption pack is not maintained in a stationary position in the container. Thus, with the upper and lower sheets being fabricated of dissolving paper, the absorbent granules will be free to escape from the pack in the presence of moisture and/or liquid regardless of which sheet is the bottom sheet during shipment.

In a second embodiment of the present invention, the upper sheet and the barrier sheets are fabricated of dissolving paper; while, the lower sheet is a liquid impermeable sheet fabricated of a mildew resistant material selected from the group consisting of plastic, rubber, combined plastic and paper, and combined rubber and paper. With this arrangement when the upper sheet and barrier sheets dissolve in the presence of moisture and/or liquid, the lower mildew resistant sheet maintains the moisture and/or liquid in contact with the absorbent granules. This prevents any moisture and/or liquid from passing out of the pack before being absorbed by the absorbent granules.

Accordingly, the principal object of the present invention is to provide an improved moisture and/or liquid absorption sectional pack having a plurality of compartments containing absorbent granules which are capable of being released from the pack to absorb increased quantities of moisture and/or liquid.

Another object of the present invention is to provide an improved moisture absorption pack having upper and lower contiguous sheets bonded together to form a plurality of sectional compartments, separated by dissolving barrier sheets, containing absorbent granules which are released from the pack by disintegration of the barrier sheets and the upper and lower sheets in the presence of moisture and/or liquid to provide for absorption by the granules of moisture and/or liquid in the vicinity of the pack but not in contact therewith.

A further object of the present invention is to provide improved absorption sectional packed formed by securing together upper and lower contiguous sheets to form a plurality of sectional compartments divided by dissolving barrier sheets operable to dissolve in the presence of moisture and/or liquid to free absorbent granules contained in the compartments to absorb increased quantities of moisture and/or liquid where the lower sheet is a liquid impermeable sheet operable to maintain the moisture and/or liquid in contact with the granules so that all the moisture and/or liquid coming in contact with the pack is absorbed by the granules before passing through the pack.

These and other objects of the present invention will be more completely disclosed and described in the following specification, the accompanying drawings and the appended claims.

DESCRIPTION OF THE PREFERRED EMBODIMENTS

Figure 1:
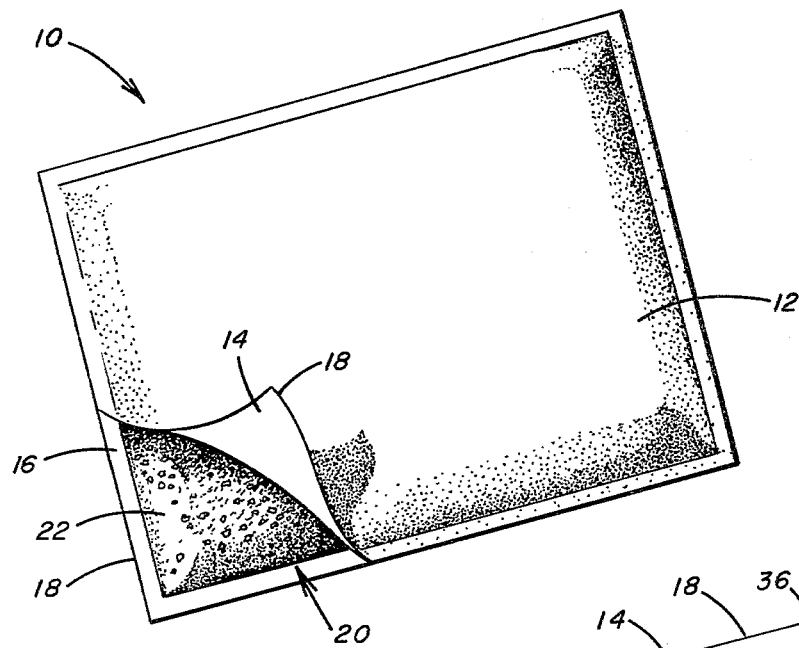
FIG. 1 is a plan view, partially cut away, of an individual sectional compartment of the improved absorption pack of the present invention, illustrating an upper sheet bonded at its outermost edges to a lower sheet to form an individual compartment containing a quantity of absorbent granules.

Referring to the drawings and particularly to FIG. 1, there is illustrated a single moisture and/or liquid absorption sectional pack generally designated by the numeral 10 forming a compartment 12 by an upper sheet of material 14 and a lower sheet of material 16. Each sheet has an outermost peripheral edge 18. The upper and lower sheets 14 and 16 are contiguously positioned one with respect to the other so that the outermost edges 18 of each sheet are positioned in overlying abutting relation. The upper and lower sheets 14 and 16 are secured together at the peripheral edges 18 in a conventional manner as will be apparent to those skilled in the art of filling and sealing machinery to provide a sealed enclosure generally designated by the numeral 20. A preselected quantity of moisture and/or liquid absorbent granules 22 are contained in the sealed enclosure 20. For purposes of illustration, the upper sheet 14 is turned back to illustrate the absorbent granules 22 in the compartment 12.

At least one of the sheets, for example, sheet 14 of the single sectional pack 10 illustrated in FIG. 1, comprises a dissolving paper constructed of water soluble film formers consisting essentially of a water soluble carboxy methyl cellulose or methocel compound. The dissolving paper is fabricated of a material selected from the group consisting of a water soluble carboxy methyl cellulose compound and a methocel compound. The compound may include a small amount of inert filler, titantium oxide and some cotton and rayon fibers. These materials are included in the carboxy methyl cellulose compound to provide the finished product with appearance and feel of paper and the tearing ability of paper. The carboxy methyl cellulose compound is very soluble in water and will dissolve readily with only a slight residue of fillers and fibers.

The other sheet 16 is preferably dissolving paper of the type described above. With this arrangement, when moisture and/or liquid contacts the sheets 14 or 16 the sheets disintegrate releasing the absorbent granules 22 from the sealed enclosure 20 to provide an increased space for the absorbent granules to occupy and increase the absorption capability of the single sectional pack 10.

In operation as moisture and/or liquid passes through either the dissolving paper sheet 14 or 16 and is absorbed by the granules 22, the sheets when contacted by the moisture and/or liquid rapidly break down in an interval of about 3 to 10 seconds. Thus, with this arrangement the entire single sectional pack 10 disintegrates releasing the absorbent granules 22 from the sealed enclosure 20. Once released from the enclosure 20, the granules 22 are operable to absorb moisture and/or liquid in the surrounding vicinity of the pack 10 but removed from contact therewith. By permitting the granules to escape from the pack 10 the absorption capability of the pack 10 is extended beyond the immediate confines of the upper and lower sheets 14 and 16.

Further, in accordance with another embodiment of the present invention, the upper sheet 14 of the single sectional pack 10 is fabricated of dissolving paper and the lower sheet 16 is fabricated of a water and mildew resistant material selected from the group consisting of plastic, rubber, combined plastic and paper, combined rubber and paper, or any other moisture and/or liquid impermeable material capable of being bonded to the upper dissolving paper sheet 14. With this arrangement moisture, water vapor and/or liquid passes through the upper sheet of dissolving paper 14 and is absorbed by the granules 22 supported by the lower sheet 16. The dissolving paper sheet 14 disintegrates thereby releasing the granules 22 from the compartment 12. By releasing the granules 22 from the compartment 12 the granules are capable of occupying an increased area for absorption of a greater quantity of moisture and/or liquid than granules confined within the sealed enclosure 20. The water and mildew resistant lower sheet 16 maintains the moisture and/or liquid in contact with the absorbent granules 22 thereby preventing any moisture and/or liquid from passing through and out of the pack 10 before being absorbed by the granules 22.

Figure 2:
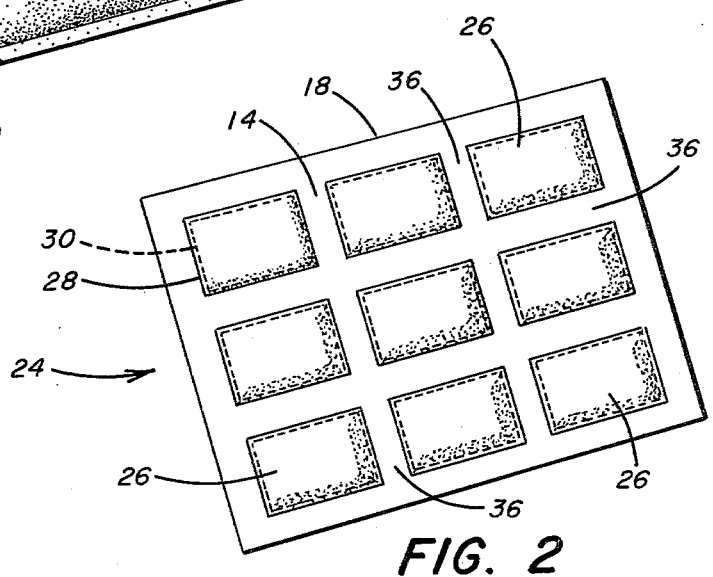
FIG. 2 is a plan view of the improved absorption pack of the present invention, illustrating a plurality of sectional compartments each containing a preselected quantity of absorbent granules.
Figure 3:
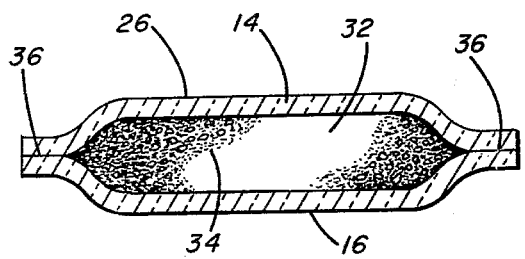
FIG. 3 is a fragmentary sectional view in side elevation of a sectional compartment formed by securing together the upper and lower sheets at their outermost edges, illustrating a quantity of absorbent granules contained in the compartment where the upper and lower sheets are fabricated of dissolving paper.
Figure 4:
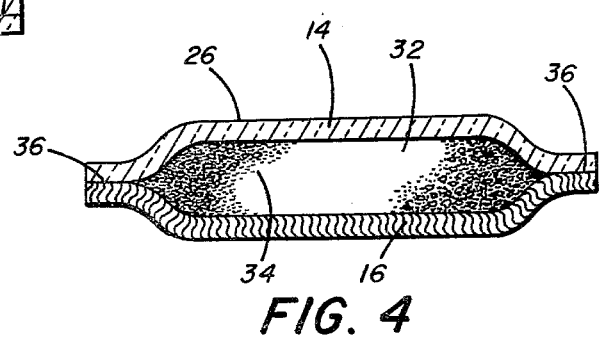
FIG. 4 is a view similar to FIG. 3, illustrating another embodiment of the present invention where the compartment is formed by an upper sheet fabricated of dissolving paper and a lower sheet fabricated of a moisture and/or liquid impermeable sheet.

Referring to FIG. 2, there is illustrated a multiple sectional pack generally designated by the numeral 24 formed by upper and lower sheets 14 and 16 as the single sectional pack 10 illustrated in FIG. 1. The upper sheet 14 is positioned in overlying relation with the lower sheet 16, which is not shown in FIG. 2, and the outermost peripheral edges 18 of each sheet are bonded or sealed together in a conventional manner known to those skilled in the art of filling and sealing machinery. In addition, to sealing the outermost contiguous peripheral edges of the sheets to each other, the sheets 14 and 16 are also secured to each other in a plurality of preselected patterns, in the same manner as referred to above, to form a plurality of sealed compartments 26. Each compartment 26 is formed by a portion of the upper sheet 14 and a portion of the lower sheet 16. The portion of each compartment 26 formed by the upper sheet 14 has an outer rectangular peripheral edge 28 secured to and positioned in overlying relation with an outer rectangular peripheral edge 30 of a portion of the sheet 16. Each compartment, as illustrated in FIGS. 3 and 4, includes an enclosure 32 containing a preselected quantity of absorbent granules 34 identical to the absorbent granules 22 described above for the single sectional pack 10.

The amount of absorbent granules in each section and the size of each granule and the size of each section 26 depends on the amount of moisture and/or liquid to be absorbed by the plurality of sections 26 forming the sectional pack 24. For example, a sectional pack having twenty sections would include 1/20 of one pound of liquid absorbing granules in each section. Thus, a 20 section pack would contain a total of one pound of liquid absorbing granules and would be capable of absorbing a total of 50 pounds of liquid. Each section holds the same amount of absorbent granules so that each section of the pack has the same liquid absorbing properties regardless of the position of the pack in use because the absorbent granules are confined to the respective sections. This permits the sectional pack to be placed in any desired environment and in any desired position such as parallel, perpendicular or at an angle to its supporting surface.

With the multiple sectional pack 24 illustrated in FIG. 2, at least one of the sheets 14 or 16 is fabricated of dissolving paper consisting essentially of a carboxy methyl cellulose compound as above described for the single sectional pack of FIG. 1. Preferably, the upper sheet 14 of the multiple sectional pack 24 is dissolving paper which is operable in the presence of moisture and/or liquid to dissolve or disintegrate in a period of time of 3 to 10 seconds to permit the granules 34 to be released from each of the enclosures 28. When the sheets 14 and 16 are connected to each other to form the plurality of compartments 26 each compartment is separated from one another by a barrier sheet 36 formed by the sheets 14 and 16 positioned in overlying abutting relation. Thus, with the dissolving paper 14 forming part of the barrier sheet 36, contact of the barrier sheet 36 with the moisture and/or liquid results in disintegration of the barrier sheet.

As the barrier sheets 36 dissolve the respective compartments 26 are broken from their initial sealed condition. This increases the space within the pack for the absorbent granules from one compartment to be supplied to the absorbent granules in the next adjacent compartment. Thus, once the granules of one section or compartment have absorbed all the liquid or moisture they are capable of absorbing, additional granules from adjacent sections are released for total absorption of the liquid or moisture.

Referring to FIG. 3 there is illustrated one of the compartments or sections 26 of the multiple sectional pack 24 illustrated in FIG. 2 where both the upper sheet 14 and the lower sheet 16 together with the barrier sheet 36 are fabricated of dissolving paper. Thus, simultaneously with the moisture and/or liquid entering the compartment 26 and being absorbed by the granules 34, the sheets 14 and 16 and the barrier sheets 36 dissolve upon contact with the moisture and/or liquid. When the sheets disintegrate or dissolve the entire pack 24 breaks open and the granules 34 are released from the pack. Releasing the granules 34 from the pack 24 permits the granules to absorb the moisture and/or liquid that may have passed through the pack without being absorbed and to absorb the moisture and/or liquid in the surrounding vicinity of the pack but not initially in contact with the pack. This arrangement is particularly advantageous for maintaining shipping containers free of moisture and/or liquid where the sectional pack 24 is free to move about in the container during shipment.

Referring to FIG. 4 there is illustrated the embodiment of the present invention where the upper sheet 14 is dissolving paper and the lower sheet 16 is a moisture and/or liquid impermeable material selected from the group consisting of plastic, rubber, combined plastic and paper, and combined rubber and paper, as for example, paper backed with plastic or rubber. The sheets 14 and 16 are suitably connected to form compartments 26 divided by barrier sheets 36.

With this arrangement in FIG. 4, moisture, water vapor and/or liquid is free to pass through the dissolving sheet 14 into the enclosures 32 formed by the compartments 26. The moisture is absorbed by the granules 34, simultaneously the sheet 14 in the presence of the moisture and/or liquid dissolves. Dissolving of the upper sheet 14 permits the granules 34 to escape from their respective compartments 26. Thus, as the moisture and/or liquid spreads throughout the multiple sectional pack 24 the compartments 26 are progressively broken open to release all the enclosed granules 34 from the pack 24 to effect total absorption of all moisture and/or liquid entering the pack 24 even if the moisture and/or liquid enters through only a single compartment 26.

Once the moisture and/or liquid contacts the dissolving paper 14 the dissolving paper disintegrates in approximately 3 to 10 seconds; however, the water and mildew resistant material of the impermeable sheet 16 remains intact. The lower sheet 16 maintains the moisture and/or liquid in contact with the absorbent granules 34 so that the moisture and/or liquid is absorbed by the granules before it is allowed to pass unabsorbed from the pack 24. When the pack 24 is maintained in a stationary position with the sheet 16 in contact with the supporting structure, the sheet 16 provides an increased area to maintain the absorbent granules 34 in contact with the moisture and/or liquid. This prevents escape of moisture and/or liquid from the pack 24 before being absorbed by the granules 34.

According to the provisions of the patent statutes, I have explained the principle, preferred construction and mode of operation of my invention and have illustrated and described what I now consider to represent its best embodiments. However, it should be understood, that within the scope of the appended claims, the invention may be practiced otherwise than as specifically illustrated and described.

I claim:

1. An improved moisture absorption pack comprising,
   upper and lower contiguous sheet means bonded to each other at the outermost contiguous edges thereof for forming an enclosure,
   barrier means for dividing said enclosure into a plurality of disintegrative sectional compartments initially sealed from each other by said barrier means,
   said sectional compartments each forming a separate enclosure containing a predetermined quantity of absorbent granules consisting of alkali metal carboxylate salts of starch-polyacrylonitrile graft copolymers,
   said barrier means and said upper contiguous sheet means being a dissolving paper fabricated of a material selected from the group consisting of a water soluble carboxy methyl cellulose compound and a methocel compound,
   said lower contiguous sheet means being a moisture or liquid impermeable sheet being fabricated of a mildew resistant sheet,
   said dissolving paper being operable to dissolve when said absorbent granules have absorbed a predetermined amount of moisture or liquid, said barrier means between adjacent compartments arranged to disintegrate and break open said sectional compartments to release said absorbent granules from each of said sectional compartments in order to permit freedom of movement of said absorbent granules, and
   said upper contiguous sheet means being operable to dissolve in the presence of moisture or liquid and permit freedom of movement of said absorbent granules on said liquid impermeable sheet so that said absorbent granules are free to occupy an increased area to absorb increased amounts of moisture or liquid.

2. An improved moisture absorption pack as set forth in claim 1 which includes,
   said upper sheet means being a dissolving paper fabricated of a material selected from the group consisting of a water soluble carboxy methyl cellulose compound and a methocel compound, and
   said upper sheet means being operable to dissolve when said absorbent granules have absorbed a predetermined amount of moisture or liquid so that said upper sheet means disintegrates permitting said absorbent granules to occupy an increased area for absorbing additional moisture or liquid.

3. An improved moisture absorption pack as set forth in claim 1 which includes,
   said absorbent granules when released from said sectional compartments being retained on said liquid impermeable sheet, and
   said liquid impermeable sheet maintaining the moisture or liquid in contact with said absorbent granules thereby preventing any moisture or liquid from passing out of the pack before being absorbed by said absorbent granules.

4. An improved moisture absorption pack as set forth in claim 1 which includes,
   said liquid impermeable sheet being fabricated of a material selected from the group consisting of plastic, rubber, combined plastic and paper, and combined rubber and paper.

* * * * *